Sept. 9, 1924.
G. W. MACKENZIE
1,507,705
LIQUID MEASURING APPARATUS
Original Filed Sept. 9, 1921  2 Sheets-Sheet 1
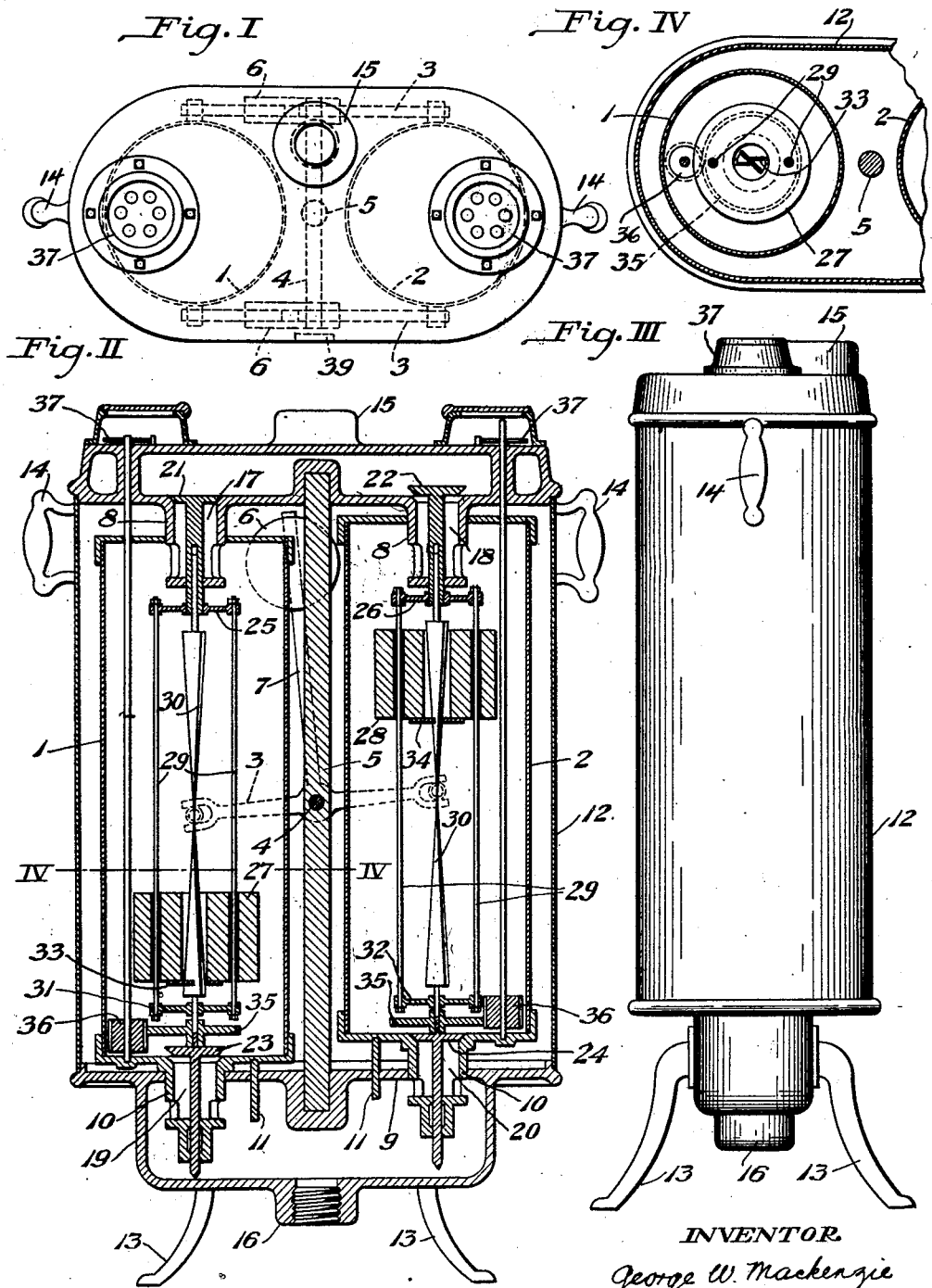
INVENTOR.
George W. Mackenzie
by Christy and Christy
his attorneys

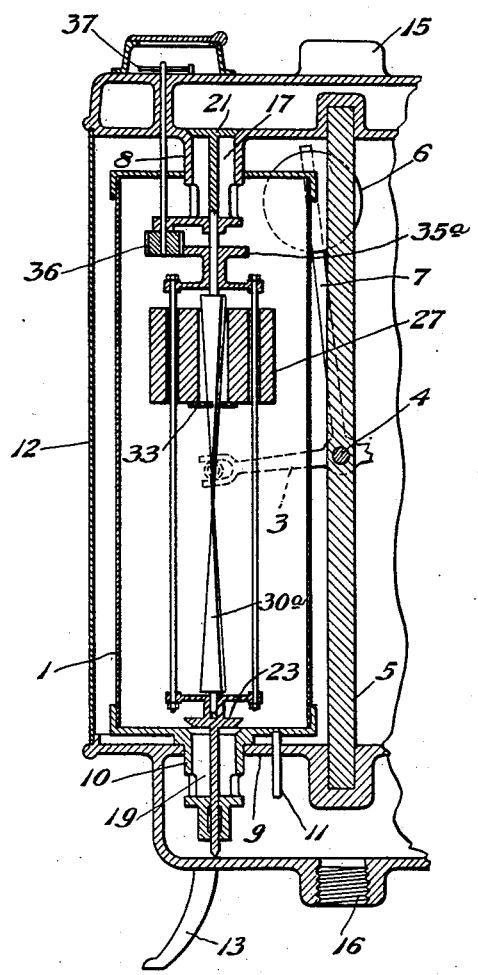

Patented Sept. 9, 1924.

1,507,705

UNITED STATES PATENT OFFICE.

GEORGE W. MACKENZIE, OF BEAVER, PENNSYLVANIA.

LIQUID-MEASURING APPARATUS.

Application filed September 9, 1921, Serial No. 499,583. Renewed February 4, 1924.

*To all whom it may concern:*

Be it known that I, GEORGE W. MACKENZIE, residing at Beaver, in the county of Beaver and State of Pennsylvania, a citizen of the United States, have invented or discovered certain new and useful Improvements in Liquid-Measuring Apparatus, of which improvements the following is a specification.

My invention relates to improvements in apparatus for measuring liquid, and, more specifically, consists in improvement upon the measuring apparatus shown and described in my application for United States Letters Patent filed August 10, 1921, Serial No. 491,114. Disclosure herein of the subject matter of my said earlier application is made because such disclosure is essential to an understanding of the present invention. I do not in making such disclosure intend dedication thereof to the public.

The apparatus is designed for measuring liquid as it flows by gravity or under pressure from a source of supply to a point of delivery. It is applicable to apparatus for measuring liquid of any sort under the general conditions named, but I have made particular application of it to the measurement of gasoline. And, in dealing with gasoline, apparatus embodying my invention may be used at filling stations and garages, as a curb measuring device for gasoline as it flows from the storage tank at the supply station to the tank of a purchaser's automobile, or it may be used in measuring gasoline as it flows from a tank car on a railway to a tank wagon, or from a tank wagon to the storage tank of a service station, or elsewhere. I shall show and describe the invention applied to apparatus suitable for measuring gasoline as it flows from a tank wagon to the storage tank of a service station, and it will be understood from what has been said that this showing and description are exemplary, and that the invention is not limited to details, suiting the apparatus to this particular service.

In the accompanying drawings Fig. I is a plan view from above of apparatus particularly designed for measuring gasoline and in which my invention is embodied; Fig. II is a view of this apparatus in vertical section; Fig. III is a view of it in side elevation; Fig. IV is a fragmentary view in horizontal section, on the plane indicated by the line IV—IV, Fig. II; Fig. V is a fragmentary view, corresponding in character to Fig. II, and illustrating a permissible modification; Fig. VI is a view in plan and to larger scale of one of the parts disassociated from the assembly, and illustrating a refinement in structure.

My invention involves the use of a well-known contrivance which, for lack of a better term, I shall call an oscillating liquid balance. This liquid balance consists essentially of two buckets borne in counterbalance on the opposite arms of a walking beam; the buckets are so arranged that each when elevated will hold liquid, when lowered will be incapable of holding liquid, but liquid previously contained will escape from it. Liquid is supplied from above, to that one of the two buckets which is elevated; while the opposite bucket, being then in lowered position, is empty or in course of emptying. As the upper bucket fills, its weight preponderates and the beam swings, the newly filled bucket descends and the opposite and now empty bucket rises. As the beam swings the liquid supply ceases to enter the newly descended full bucket and begins to enter the newly risen empty bucket. At the same time that this comes about, the newly descended bucket comes to such a position that its load of liquid escapes from it. Then, when the bucket which originally was the lower and which now has become the upper bucket fills and the opposite bucket, now the lower, has emptied, the return oscillation is accomplished by gravity.

My invention involves the adaptation of this old liquid balance to service conditions, and consists further in the provision of means for measuring the liquid as it escapes from one and the other of the two buckets, in turn.

Referring to the drawings, two buckets 1 and 2 are shown, borne on opposite arms of a pair of beams 3 pivoted on a shaft 4, the shaft in turn being carried in a suitable support, in this instance a post 5. The buckets are hung as shown on trunnions, to the end that as the beams swing they may rise and descend in substantially true vertical position. Weights 6 borne on arms 7 extending perpendicularly from beams 3 at the pivot point insure bucket-filling to the desired maximum before oscillation. Guides for the reciprocating buckets are found in the stationary cylindrical bosses 8 which extend through openings in the plates which cover the buckets at the upper end, and in cylindrical bosses 10 which extend downwardly from the bottoms of the buckets through openings in a stationary plate 9. Eccentrically placed pins 11 extending vertically downward from the bottoms of the buckets through guide openings in plate 9 hold the buckets from rotation on their axes.

Post 5, bosses 8, and plate 9 are all carried by a casing which includes a shell 12, and which encloses the whole. The present apparatus being intended for service of the nature indicated, the casing is provided with feet 13 and with handles 14.

Within the casing above and below the buckets are arranged chambers for incoming and outgoing liquid; to the one an inlet tap 15 opens, from the other an outlet tap 16 leads.

Openings 17 and 18 from the upper chamber lead through the bosses 8 to the two buckets, and from the buckets openings 19 and 20 lead through the bosses 10 to the lower chamber. The bosses above and below and the openings through them are aligned, as the drawings indicate. These four openings are controlled by poppet valves, 21, 22, 23 and 24, all of which close downwardly, in the direction of flow. Valve stems extend downwardly from the upper valves 21 and 22, and stems extend both upwardly and downwardly from the lower valves 23 and 24. The downwardly extending stems of the upper valves and the upwardly extending stems of the aligned lower valves are relatively movable longitudinally and relatively rotatable, they abut as the operation progresses, and preferably they engage one another in the telescopic joint shown; the downward extending stems of the lower valves extend into proximity to the bottom of the casing which forms the lower chamber and are adapted to make rotary bearing upon the bottom of the casing. The proportions of these valve stems are such that descent of a bucket allows the upper valve to close while the lower valve is unseated by engagement of its downwardly extending stem with the wall of the casing below; while ascent of a bucket allows the lower valve to close, while the upper valve is unseated by the abutment of its stem upon the upwardly extending stem of the lower valve—the lower valve being at the same time itself raised bodily with the rising bucket. In Fig. II the bucket on the left is shown in lowered position, with valve 21 closed and valve 23 open, while the bucket on the right is shown in raised position, with valve 24 closed and valve 22 open. Consideration of this figure will make plain the details of the foregoing description. It will be observed that the combined length of the abutting stems of the aligned valves is greater than the distance between the valve seats when a bucket is raised and less than the distance between the valve seats when a bucket is lowered.

Operation of the apparatus as thus far described is as follows, particular reference being had to Fig. II. The source of gasoline supply, as for example a tank wagon, is connected by a hose with inlet tap 15, and another hose connection is made from outlet tap 16 to the place of delivery, as for example the storage tank of a service station. Under such conditions the flow is ordinarily by gravity. The parts being in the position shown, gasoline entering at 15 is flowing through port 18 into the right-hand bucket, 2; at the same time gasoline previously contained in the left-hand bucket, 1, is flowing out through port 19 to the outlet 16. This condition obtains until the excessive weight of bucket 2 over bucket 1 overcomes the gravity of weights 6, then exerted in opposition to the descent of bucket 2. When this change in weight has come about beams 3 swing, bucket 2 descends and bucket 1 rises. As this occurs the gravity of weights 6 is shifted and exerted now to sustain bucket 1 in elevated position. When the relative positions of the two buckets so change, the valves are reversed, and empty bucket 1 begins to be filled, while full bucket 2 begins to empty. This filling and emptying continues until the weight of bucket 1 so far exceeds that of bucket 2 that the gravity of weights 6 is again overcome, whereupon the beams swing again, and the parts return to the position shown in Fig. II. Thus as the gasoline flows it is carried alternately by one bucket or the other, and the periodic oscillation of the buckets takes place.

It remains to describe the measuring apparatus.

Secured to the stems of the upper valves 21 and 22 are two cages; these cages consist of upper spiders 25 and 26, rigidly secured to the valve stems, lower spiders 31 and 32, and rods 29, connecting the spiders. In effect the lower spiders 31 and 32 are by rods 29 hung from the upper spiders 25 and 26. The rods 29 are of such length that the cage extends through the greater part of the length of the bucket, from top to bottom. The spiders encircle the upwardly extending stems of valves 23 and 24 and there is free relative rotary and longitudinal movement between cage and valve stem. In the buckets are floats 27 and 28; through each float is a vertical central opening for the extension through of the upwardly extending stem of the lower valve (23 or 24), and also vertical lateral openings, through which the rods 29 are threaded. The upwardly extending stems of the lower valves, throughout that portion of their extent which in normal operation is covered by the play of spiders longitudinally upon them are truly cylindrical, but throughout so much of their length as is covered by the rise and fall of the floats 27 and 28, these valve stems are flattened, and their flattened surfaces are spiraled longitudinally, as appears at 30. In the central openings in the floats, through which the stems 30 extend, slots 33 and 34 are formed, and the lips of these slots, closely opposing the flat faces of the stems 30, effect rotation of stem and float, one relatively to the other, as these parts move longitudinally, one relatively to the other. To the valve stems are keyed gears 35; these mesh with gears 36 of tally registers 37. Provision is made for maintaining gears 35 and 36 constantly in mesh throughout the range of vertical movement of the valve stems 30; this may conveniently be achieved in an elongation of the bodies of one or of both of the gears.

The oscillation of buckets 1 and 2 has been explained. As oscillation takes place the valves which control the filling and the emptying of the buckets open and close; when a bucket is down its outlet valve is open, due to abutment of its downwardly extending stem with the lower wall of the chamber beneath; at the same time the inlet valve 21 above is closed by gravity and in the direction of flow. When a bucket is raised its outlet valve is closed by gravity and in the direction of flow, and at the same time its inlet valve is opened by abutment of the aligned valve stems. Filling and emptying effect rise and descent of the floats. The position of parts as shown in Fig. II is this: the left-hand bucket is down and nearly if not quite empty, and the right-hand bucket is raised and nearly if not quite full. Giving attention first to the left-hand bucket, it will be observed that valve 21 is seated and valve 23 unseated. By virtue of the fact that valve 21 is seated, the cage which is carried by its stem is held secure against rotation. The float 27 which has descended to or near its lower limit has descended in right-line course, without rotation, being held thereto by rods 29. As it has descended, the engagement of slot 33 with the spiraled portion 30 of the stem of valve 23 has caused the valve stem and the valve with it to rotate. This has been possible because at the time valve 23 has stood free of its seat. Rotation of this valve stem has driven the tally register, through the gearing already described.

Turning attention now to the right-hand bucket, which stands in raised position, it will be seen that it is the lower valve, 24, which is closed, and the upper valve, the inlet valve 22, which is open; accordingly, it is the valve stem 30 which on this side is secure against rotation, while the float 28 and the cage and the valve 22 are free to rotate. It will be apparent then that as this right-hand bucket has filled and float 28 has risen, no driving impulse has been imparted to the tally mechanism 37 above. Presently the emptying of the left-hand bucket and the filling of the right-hand bucket will be completed, beams 3 will swing, the bucket positions will be reversed, the valve positions will be reversed; the right-hand bucket will begin to empty and in its emptying the tally register on the right will operate while on the left-hand side the bucket will be filling and the tally will be at rest.

In the progress of operation first one valve stem 30 is rotated and then the other, and accordingly first one tally register and then the other records the descent of a float and the extent of movement of the tally register is an index of the range of float descent. It appears, then, that while the oscillation of the beams 3 is effected by weight the measurement of the gasoline is not by weight but by volume. The mere recording of the number of oscillations of the beams 3 would be an index of the amount of gasoline delivered, but it would be an index of weight. Gasoline varies in specific gravity, but it is sold by volume. My apparatus affords accurate volumetric measurement. As the specific gravity of the gasoline varies the range of rise and fall of floats 27 and 28 will vary, but always the record will be an accurate volumetric record.

The buckets being truly cylindrical it will be understood that every inch of downward movement of the float is an accurate indication of volume. Conveniently the pitch of the spiral is so proportioned to the diameter of the bucket that one half turn of the spiral records one gallon escaping from the bucket. And further the ratio of gears 35 to 36 is as 2 to 1, to the end that one complete rotation of the shaft of the tally means one gallon of gasoline delivered. A rotary valve, indicated at 39 in Fig. 1, may control an air-hole through the casing. This valve may be operated by shaft 4, the arrangement being such that when the beams 3 are in horizontal position the valve will be closed, but, as the beams 3 move from horizontal position in either direction, the valve will be opened. It will be understood that when the beams 3 extend in horizontal position all valves are closed.

My only reason for providing two tallies and connecting the two spindles 30 each with its own tally, is that such an arrangement minimizes the amount of transmission gearing requisites, and gives the simplest possible apparatus.

Materials and proportions are such as may be found advantageous. Brass, for example, may be used in the formation of the buckets and the shell; the end structures above and below may, for the sake of lightness, be made of cast aluminum; the post 5 and the beams 3 of steel. The floats will be of such material as will resist gasoline penetration. They may, for example, be formed of cork, or of balsam wood, suitably treated and coated, or they may be hollow brass shells. The openings through them may be provided with suitable bushings, ordinarily of brass. The bottom plates for the floats, in which the slots 33 and 34 are formed, will ordinarily be brass plates. It will be remarked of the floats that, even though they become more or less waterlogged, so long as the specific gravity continues less than that of gasoline, they will still rise and fall with the filling and emptying of the buckets, and the rise and fall will be a true volumetric index of gasoline delivery. It should further be remarked that frictional variations in the bearing of the slot in the float upon the spiral surface of the spindle will not affect the accuracy of the measurement. The float makes its travel, and, whether the transmission be with greater or less friction, the travel of the measuring apparatus will be the same for a given float movement. The weights 6 may of course be adjustable, and by adjustment effect with nicety the weight of gasoline introduced to and withdrawn from the bucket with each reciprocation.

The range of bucket oscillation may be, say three quarters of an inch; of valve reciprocation, three eighths of an inch.

Turning now to Fig. V, the modification there illustrated will readily be understood: In this arrangement it is the downwardly extending stem of the upper valve (21, 22) which is prolonged to constitute the spiral surfaced spindle 30ª; it extends through the length of the bucket and terminates near the bottom, where it makes abutment in a rotary bearing upon the relatively short upwardly extending stem of the lower valve (23, 24). The cage is carried by and integrated with the lower valve and is freely rotatable upon the stem of the upper valve; the gear wheel 35ª is integral with the cage. With this variation in structure, the parts being in the position shown, and the bucket in course of being emptied, the descending float (27, 28) will, because of the fact that the upper valve is closed and with its stem is secured against rotation, while the lower valve is open and together with the cage which it carries is free to rotate, effect rotation of the tally mechanism. When the position of the valves is reversed, and the bucket is in course of being filled and the float is rising, the lower valve is seated and with it the cage is firmly held against rotation. The rising float, itself secured against rotation but held to right-line ascent, will impart rotation to the upper valve, but this will be idle rotation; the tally mechanism will remain at rest.

Fig. VI shows a refinement of engagement of the float (27, 28) with the spiralled spindle 30 and with the guide rods 29. In place of simple slots 33, 34 indicated in Figs. II and IV, pairs of rollers 40, 40 are suitably journalled in the body of the float, and these form the slot, by and between their opposite surfaces. The contact then with the spindle 30 is a rolling contact, in which friction is reduced to a minimum. Similarly the engagement of the floats with the guide rods 29 may be a rolling contact. The drawing shows pairs of rolls 41, 41 engaging the rods 29. Conveniently two sets of rolls 41, 40, 41 may be mounted on two axles 42 and upon these axles the rollers may be mounted for free rotation.

These and other modifications and refinements are permissible; it will be understood that in matter of detail the showing afforded is exemplary merely.

I claim as my invention:

1. In liquid-measuring apparatus the combination of a bucket, two vertically aligned filling and emptying valves, the said valves being provided with stems prolonged and abutting one upon the other, such abutting permitting relative rotary movement, one of the said valve stems being provided with a spirally disposed surface, a float within the bucket engaging the spirally disposed valve-stem surface, means for holding one of such inter-engaged members against rotation, an indicator operated by the relative rotary movement of float and valve stem, and means for shifting said valves to and from alternate closure, substantially as described.

2. In liquid-measuring apparatus the combination of a liquid inlet chamber having an opening in its bottom wall, a downwardly closing valve in said opening, a vertically movable bucket arranged beneath said chamber, said bucket having an opening in its bottom, aligned vertically with the aforesaid opening in the bottom wall of said inlet chamber, a downwardly closing valve in said opening, the two said valves provided with abutting and relatively rotatable stems, the length of the combined stems exceeding the distance between the said openings when the bucket is in raised position and being less than the distance between the openings when the bucket is in lowered position, means for limiting the downward movement of the valve in the bottom of the bucket, a float in said bucket, spirally disposed surfaces of engagement between float and valve stem, means for holding one of such inter-engaged members against rotation, an indicator, and means whereby the rotary relative movement between valve stem and float imparts movement to said indicator, substantially as described.

3. In liquid-measuring apparatus the combination, with an oscillating liquid balance, including a bucket borne in counterpoise and having a bottom discharge opening, of a valve in said opening provided with a stem extending vertically within said bucket, a float within said bucket engaging said valve stem over spirally disposed surfaces of engagement, means for holding one of such inter-engaged members against rotation, an indicator, and means for imparting to said indicator the relative rotary movement of float and valve stem incident to vertical movement of the float within the bucket, substantially as described.

4. In liquid-measuring apparatus the combination of an upper inlet chamber and an outlet chamber, a bucket vertically oscillatory in the space between said chambers, means for imposing on said bucket vertical oscillation of limited extent, vertically aligned openings in the bottom of the upper chamber and in the bottom of the bucket, downwardly closing valves in said openings, valve-stem connection through which said valves make vertical abutment one on the other, such interconnection permitting rotary movement one relatively to the other, a stem extending downwardly from the valve in the bottom of the bucket, the said valve-stem connection being shorter than the distance between the said openings when the bucket is down and longer than the distance between the openings when the bucket is raised, said downward extending stem from the valve in the bottom of the bucket being shorter than the distance between the opening in the bottom of the bucket and the bottom wall of the outlet chamber when the bucket is raised and longer than the distance between these parts when the bucket is down, a float in said bucket, rotation-imparting engagement between float and valve stem, means for holding one of such inter-engaged members against rotation, an indicator, and means for imparting movement to the indicator in response to relative rotary movement of float and valve stem, substantially as described.

In testimony whereof I have hereunto set my hand.

GEORGE W. MACKENZIE.

Witnesses:
FRANCIS J. TOMASSON,
HARRY E. VANDERSYDE.